United States Patent
Lee et al.

(10) Patent No.: US 6,330,327 B1
(45) Date of Patent: Dec. 11, 2001

(54) INTELLIGENT AREA CODE UPDATE SYSTEM AND METHOD

(75) Inventors: Gene W. Lee; Srikanth Subramanian, both of Plano, TX (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/342,782

(22) Filed: Jun. 29, 1999

(51) Int. Cl.[7] ............................. H04M 3/00; H04M 5/00
(52) U.S. Cl. ................................ 379/266.1; 379/142.06
(58) Field of Search .................... 379/265.01–265.14, 379/266.01–266.1, 201.01–201.12, 219, 220.01, 142.01–142.18, 121.01–121.06, 122, 127.01–127.06

(56) References Cited

U.S. PATENT DOCUMENTS

| | | | |
|---|---|---|---|
| 5,001,710 | * 3/1991 | Gwarys et al. | 370/271 |
| 5,341,413 | * 8/1994 | Hori et al. | 379/93.19 |
| 5,528,680 | 6/1996 | Karpicke | 379/355 |
| 5,754,636 | 5/1998 | Bayless et al. | 379/127 |
| 5,867,562 | 2/1999 | Scherer | 379/88 |
| 5,978,462 | * 11/1999 | Fuhrmann et al. | 379/201 |
| 5,991,368 | * 11/1999 | Quatse et al. | 379/88.25 |

\* cited by examiner

Primary Examiner—Ahmad Matar
Assistant Examiner—Benny Q. Tieu
(74) Attorney, Agent, or Firm—Bourque & Associates, P.A.

(57) ABSTRACT

A system and method of retrieving customer records regardless of area code change affecting customer telephone numbers stored in customer records is provided. The method begins by providing an area code changes user interface on a system user display, which is configured to accept area code changes input by the system. Area code changes, which include actual area codes and old area codes are input using the interface. Next, each input area code change is stored in an area code changes memory. An ANI string corresponding to an incoming telephone call is then received and at least one customer record database is searched to identify any call records that include a telephone number corresponding to the ANI string. If no customer records are identified, then the area code changes memory is searched to identify if the ANI string includes an area code corresponding to an actual area code stored in the area code changes memory. If an actual area code match is found, then the ANI string is modified by replacing the area code included in the ANI string with the old area code corresponding to the actual area code stored in the area code changes memory. The customer record database search is then repeated until there are no more actual area codes stored in the area code changes memory that correspond to the area code included in the ANI string.

8 Claims, 3 Drawing Sheets

US 6,330,327 B1

INTELLIGENT AREA CODE UPDATE SYSTEM AND METHOD

FIELD OF THE INVENTION

The present invention concerns the field of computer telephony integration (CTI) and more specifically, the invention provides a system and method whereby a CTI system can perform an automatic area code update search in order to retrieve customer records (CRs) associated with a telephone number detected by said CTI system from an inbound telephone call.

BACKGROUND OF THE INVENTION

Many businesses and customer service organizations utilize telephone call centers to place outbound telephone calls and receive inbound telephone calls to and from customers or potential customers, for example, for credit collection or telemarketing. Computer telephony integration (CTI) which integrates computer control over a telephone switching system has allowed telephone call centers to more efficiently handle both outbound telephone calls and inbound telephone calls. These computerized telephony systems typically include an automated or predictive dialer that automatically places outbound telephone calls and an automatic call distributor (ACD) that handles large volumes of inbound telephone calls. These, and other components of the telephony system, are controlled by a telephone call center management system. One example of a system and method for integrating outbound and inbound telephone calls is disclosed in greater detail in U.S. Pat. No. 5,586,179, issued Dec. 17, 1996, assigned to the assignee of the present invention and incorporated herein by reference.

Telephone call centers also include a number of audio head sets and data terminals used by agents or operators to communicate with the called parties and calling parties. Using a data terminal, such as a PC, an agent can view and/or enter call record data pertaining to the party (e.g., the customer or potential customer) and the transaction being made. The telephone call center management system typically controls the allocation of the agents to the inbound and/or outbound telephone calls and the management of the data presented to the agents and entered by the agents. The processing of a series of telephone calls (inbound or outbound) in a telephone call center is often referred to as a call campaign.

Modern CTI systems include sophisticated hardware and software designed to improve the efficiency of call centers. For example, when servicing inbound calling campaigns, call center CTI systems attempt to identify a calling party before the calling party is actually connected to a live call center agent. When a calling party is identified, the CTI system can search through its database of customer records and determine whether or not the calling party is a known customer. If the calling party is a known customer, then the CTI system can retrieve information regarding the customer from the database and display certain pieces of the retrieved information on the agent display associated with the call center agent to whom the incoming call is directed. In this way, the call center agent will have information available to him or her that will aid in the processing of the call. For example, the incoming caller's name and address may be displayed so that instead of requiring the call center agent to transcribe the name and address of the calling party into the system in real time, the CTI system would include the information in the appropriate fields and only require the call center agent to verify the name and address of the calling party. In this way, transcription errors will be avoided and the time required for an agent to type the information into his or her terminal will be eliminated.

Various systems and methods exist by which a CTI system can obtain identifying information from an incoming caller. One such system includes an integrated voice response (IVR) unit which queries an incoming caller to input certain information into his or her telephone keypad, such as an account number or the like. This type of system requires an action on the part of an incoming caller, and as such is not an ideal situation since many incoming callers will simply not provide the desired information and will merely hang up upon being connected to an IVR unit. Therefore, more sophisticated systems have been developed, which do not require any action on the part of a calling party to identify that party.

Typically, these more sophisticated systems include automatic number identification (ANI) and dialed number identification (DNI) systems. ANI is a basic element of telephone calls, which is transported throughout the public and private telephone networks. For the North America Numbering Plan (NANP), an ANI string currently includes 10 digits. ANI is used extensively by CTI systems for call routing, call billing, call tracking and call identification.

For example, a CTI system may use the information that is provided by these two basic information sources as follows. First, the CTI system would identify the DNI in order to identify the nature of the incoming call. The system would then retrieve information from a database, such as a script or product or service information that an agent could use in handling the call. Simultaneously, the CTI system could search a database of existing customers and identify if an customer exists that has called from the number identified by the ANI signal. If such a customer exists, then the CTI system can display customer information on an agent display or merge the same with the retrieved product or service information to facilitate the agent's handling of the incoming call.

However, as more and more telephone extensions are placed in service (e.g. mobile telephones), telephone companies are finding that the limit of telephone numbers available in certain area codes are being reached. This is especially true in larger metropolitan areas. Accordingly, the telephone companies are splitting geographic areas that had previously been served by one telephone area code into areas having two or more new area codes. Fortunately, the remaining portion of the existing telephone number are not affected by area code changes. Nonetheless, an area code change places an immediate burden on many CTI systems since the systems will not be able to readily identify calls placed from telephone numbers that have had their area codes changed. For example, an existing customer having an old telephone number of (123) 456-7890, which is retained in a customer record, would not be identified by a CTI system if the customer's area code were changed.

Since area codes are assigned based on some type of geographic attribute associated with a telephone number (e.g. house location), area code changes are based on sub-geographic attributes within an initial geographic area. Thus, in order to update a database of call records to reflect area code changes, a database maintainer would need to know all of the geographic rules applicable to an area code change as well as the geographic attributes associated with each telephone number maintained in the database. As can be appreciated, this would be an impractical task.

In addition, since customer record databases are generally maintained by product or service providers and not by sophisticated computer information system organizations, the resources, in terms of programmers, would not generally be available to update a database even if all of the geographic area code change rules were known.

Therefore, what is needed is an automatic area code update system and method that would operate in conjunction with a CTI system and, specifically, an ANI-based customer identification module thereof. Such a system would be especially desirable if it included a simple graphical user interface that would allow a non-technically skilled CTI system supervisor to input area code changes into the CTI system and have the system perform an intelligent area code search each time an incoming call is detected that has originated from a new area code that has been input into the system.

SUMMARY OF THE INVENTION

A system and method of retrieving customer records (CRs) regardless of area code changes affecting customer telephone numbers stored in the CRs is provided. The system and method are used in conjunction with a computer telephony integration (CTI) system. The CTI system includes an automatic number identification (ANI) system and interfaces with at least one customer record (CR) database. The CTI system, including the automatic area code update system, is operated by a system user, having a system user terminal including a display and at least one input device.

The automatic area code update system includes an area code changes (ACC) user interface displayed on the system user display. The ACC user interface is configured to accept and display area code changes input by the system user using the system user input device. Each area code change includes an actual area code, which corresponds to a new area code as well as an old area code that has been changed to the new, actual area code.

The system also includes an ACC memory for storing the input area code changes. Finally, the system includes a lookup processor for searching at least one CR database to identify one or more CR corresponding to a received ANI string and, if no matches are found, for searching the ACC memory to identify if the ANI string includes an area code that has been changed, in which case the lookup processor modifies the ANI string by replacing the area code included in the string with the old area code corresponding to the actual area code received from the CTI system.

The method begins by providing an area code changes (ACC) user interface on a system user display, which is configured to accept area code changes input by a system user. Area code changes, which include actual area codes and old area codes are input using the ACC user interface. Next, each input area code change is stored in an area code changes memory. Then, an ANI string corresponding to an incoming telephone call is received and at least one CR database is searched to identify any customer records that include a telephone number corresponding to the ANI string. If no CRs are identified, then the area code changes memory is searched to identify if the ANI string includes an area code corresponding to an actual area code stored in the ACC memory. If an actual area code match is found, then the ANI string is modified by replacing the area code included in the ANI string with the old area code corresponding to the actual area code stored in the area code changes memory. The CR database search is then repeated until there are no more actual area codes stored in the area code changes memory that correspond to the area code included in the ANI string.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
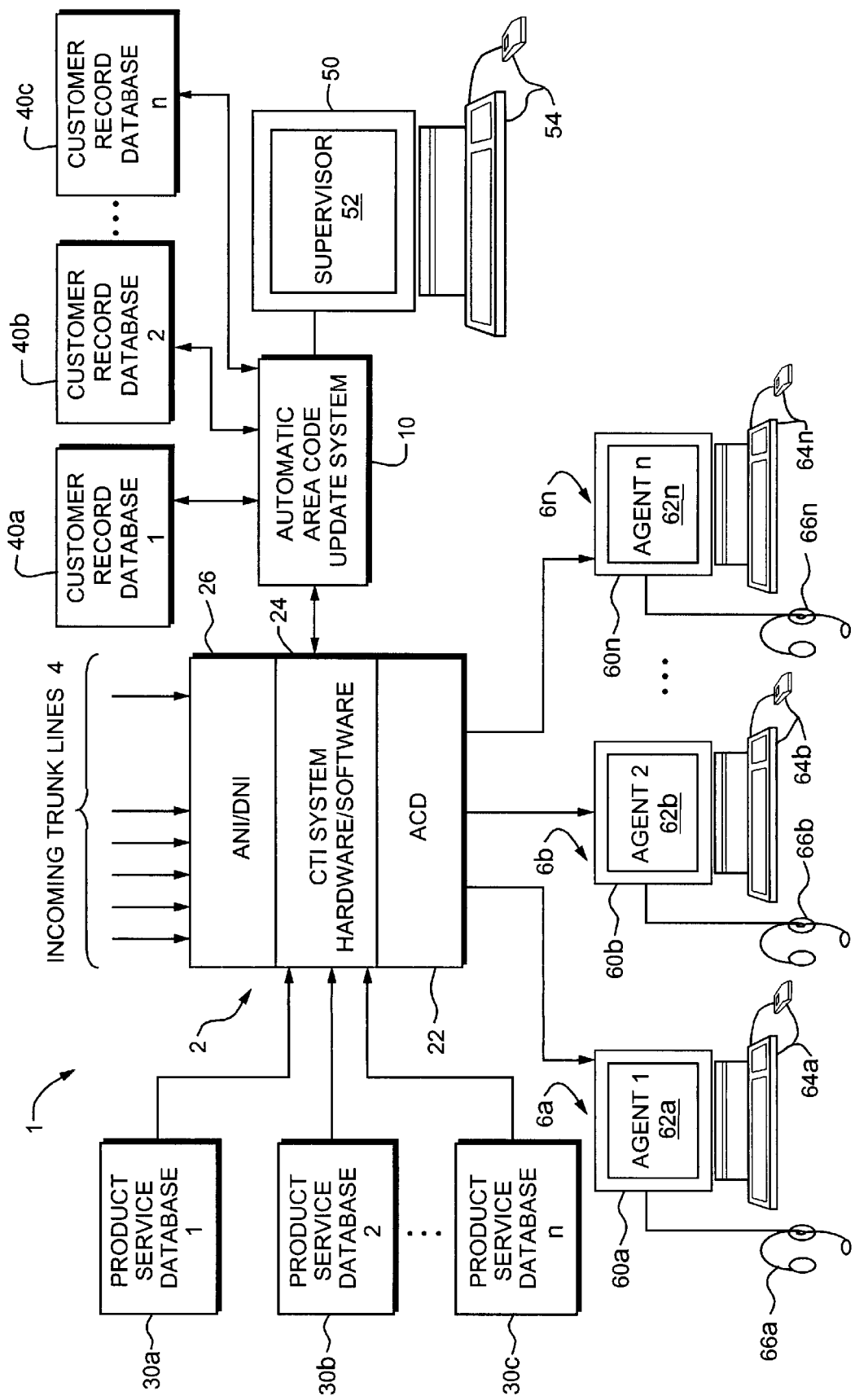
FIG. 1 is a block diagram showing an automatic area code update system according to the present invention and how it interrelates with a computer telephony integration (CTI) system at a call center.

Turning now to the figures and, in particular FIG. 1, an automatic area code update system 10 is shown as it interrelates with, for exemplary purposes only, a call center 1 and the typical components included therein. The call center 1 includes a computer telephony integration (CTI) system 2, which interfaces a plurality of incoming trunk lines 4 with one or more call center agent workstations 6.

Each agent workstation 6 includes a call center agent terminal 60, which includes a display device 62, at least one input device 64, such as a computer keyboard or mouse, and an audio input/output device 66, such as a headset. The CTI system 2 receives incoming telephone calls over incoming trunks 4 and directs calls to a call center agent 6 preferable utilizing an automatic call distributor (ACD) 22.

The CTI system 2 and the call center agents 6 are monitored and controlled by a system supervisor using a system supervisor terminal or workstation 50. The system supervisor workstation 50 includes a system supervisor display 52, which displays a variety of information regarding the CTI system operation, including agent loading and productivity information. The supervisor operates his or her workstation using one or more input devices 54, such as a keyboard and mouse. In addition, a system supervisor may connect him or herself to an agent workstation 62 or an incoming caller using an audio link with an audio input/output device, such as a headset 56.

As if well known to those skilled in the art, in order to provide a call center agent with sufficient information in order to handle an incoming call, the CTI system 2 includes system hardware and software 24 that retrieves information and provides the same to a call center agent 6 handling an incoming call. For example, the CTI system hardware and software 24 may retrieve product or service information from one or more product/service database 30.

A number of systems and methods are well know to those skilled in the art for identifying the purpose of an incoming call in order to allow the CTI system 2 to retrieve information that would be applicable to a particular call. For example, the CTI system may include an interactive voice response (IVR) unit (not shown) which queries an incoming caller regarding the nature of the call. Based on the responses provided by the incoming caller, which are typically input using the caller's telephone keypad, the CTI system will be able to retrieve the appropriate product or service information. Another means available utilizes dialed number identification (DNI) which the CTI system 2 identifies using an automatic number identification (ANI)/DNI sub-system 26. Since a call center would routinely offer its services to a number of product or service providers, the call center CTI system 2 would identify the telephone number dialed by an incoming number and retrieve the appropriate product or service information accordingly, or use the DNI information to route the call to an appropriate agent set up to handle such calls.

Many times incoming calls received by the call center 1 over incoming trunk lines 4 are placed by known customers of a call center's existing clients. Accordingly, it is often desirable to have available to a call center agent 6 handling an incoming call from an existing customer, information regarding the existing customer placing the call. Such information is typically maintained in at least one customer record database 40. Such customer record database(s) may be made available to the call center 1 by downloading the same to the call center or by providing a communications link between the call center 1 and a customer record database 40, which is maintained at a call center client's site.

In a typical CTI system, the CTI system hardware and software 24 would receive an ANI string attached to an incoming call, and search the customer record database(s) 40 in order to identify one or more customer record (CR) that includes a telephone number corresponding to the received ANI string. However, as indicated earlier, an area code change implemented by a telecommunications provider would result in the transmission to a call center of an ANI string that includes numeric information corresponding to an area code that is not stored in any CR. In such cases, the CTI hardware and software 24 would be unable to retrieve a customer record even if the customer placing the incoming call is an existing customer of the product or service provider contracting with the call center.

Accordingly, the disclosed invention provides an automatic area code update system 10 which is configured to accurately search one or more customer record database 40 and retrieve a customer record corresponding to an incoming caller regardless of an area code change effecting the telephone number of the incoming caller.

Figure 3:
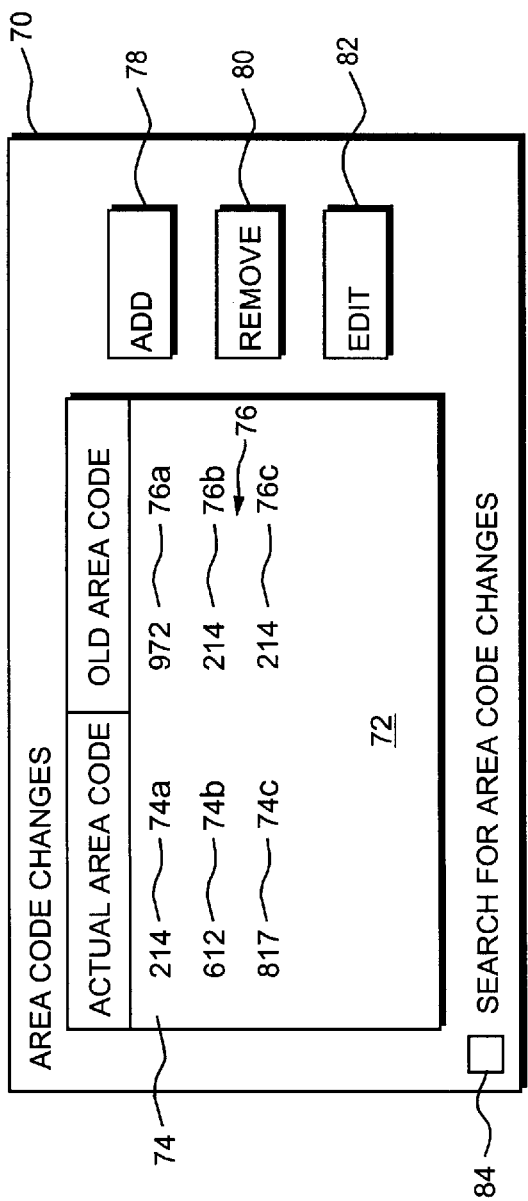
FIG. 3 is an area code changes user interface, which is displayed on a system user display.
Figure 2:
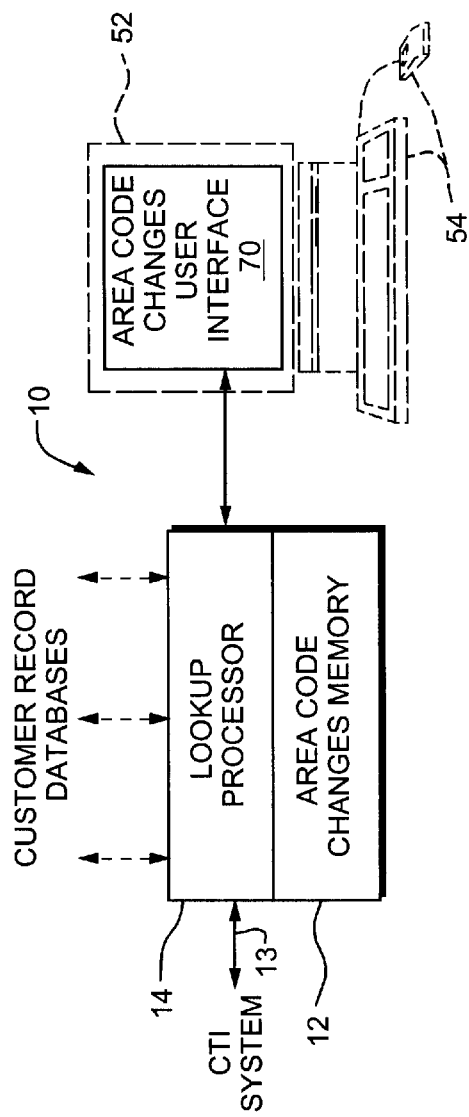
FIG. 2 is a more detailed block diagram of an automatic area code update system according to the present invention.

The components of the automatic area code update system according to the present invention are more fully shown in FIGS. 2 and 3. The automatic area code update system 10 includes and area code changes (ACC) user interface 70, which is displayed on a system user display, such as the system supervisor display 52. The ACC user interface 70 is configured to accept and display area code changes, which are input by a system user, such as a system supervisor, using one or more system user input devices 54.

The automatic area code update system 10 also includes an area code changes (ACC) memory 12, for storing area code changes that are input by the system user. The automatic area code update system 10 further includes a look up processor 14, which searches the ACC memory 12 in response to an ANI string 13 received from the CTI system 2 that does not correspond to at least one CR database entry, to identify if at least one area code change stored in the ACC memory 12 corresponds to the received ANI string that did not result in a CR match.

The ACC user interface 70 displays, in a changed area code display area 72, a list of actual area codes 74 which correspond to old area codes which are displayed in an old area code list 76, also provided in the display area 72. The actual area codes and old area codes are displayed in a manner such that each actual area code list 74 corresponds directly to an old area code displayed in the old area code list 76.

The ACC user interface is preferably a graphical user interface (GUI), which incorporates simple "point and click" buttons 78–82, which can be selected by a system user using a system user input device 54, such as a mouse, to add, remove, or edit area code changes as they are implemented by the various telecommunications companies. As shown in FIG. 3, these user selectable buttons can include an add button 78, and remove button 80, and an edit button 82. The ACC user interface 70 also allows the system user to activate or deactivate the automatic area code update system by checking or unchecking a system enable check box 84.

Figure 4:
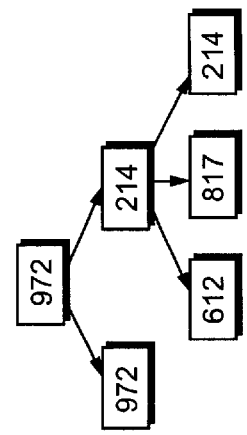
FIG. 4 is a diagram showing one example of an area code change hierarchy.

The area code changes displayed in the changed area code display area 72 of FIG. 3 is shown in hierarchical fashion in FIG. 4. As can be seen, an initial area code (972) is first divided into two area codes, (972) and (214). Since a portion of the original telephone exchanges included in the (972) area code will retain the (972) area code, a single area code change is indicated in the changed area code display 72 (FIG. 3). This change is indicated by actual area code (214) displayed as 74a and actual area code list 74, which corresponds to old area code (972), which is displayed as old area code 76a and old area code list 76.

Subsequent to the first area code split, the (214) area code is divided by the telecommunications provider into three area codes, (612), (817) and the earlier created (214) area code. Since this event includes the addition of two new area codes, this event is indicated by inputting and displaying the new area codes corresponding to the old area code as items 74b–76b and 74c–76c on ACC user interface 70 (FIG. 3).

The area code changes are simply input, removed or edited by a system user using the ACC user interface 70 and do not require any computer programming knowledge or experience on the part of the system user.

The automatic area code update system 10 may also receive a DNI string from the CTI system 2, which will be utilized by the look up processor to restrict its CR database search to one or more selected CR databases, which would correspond to the received DNI input.

Figure 5:
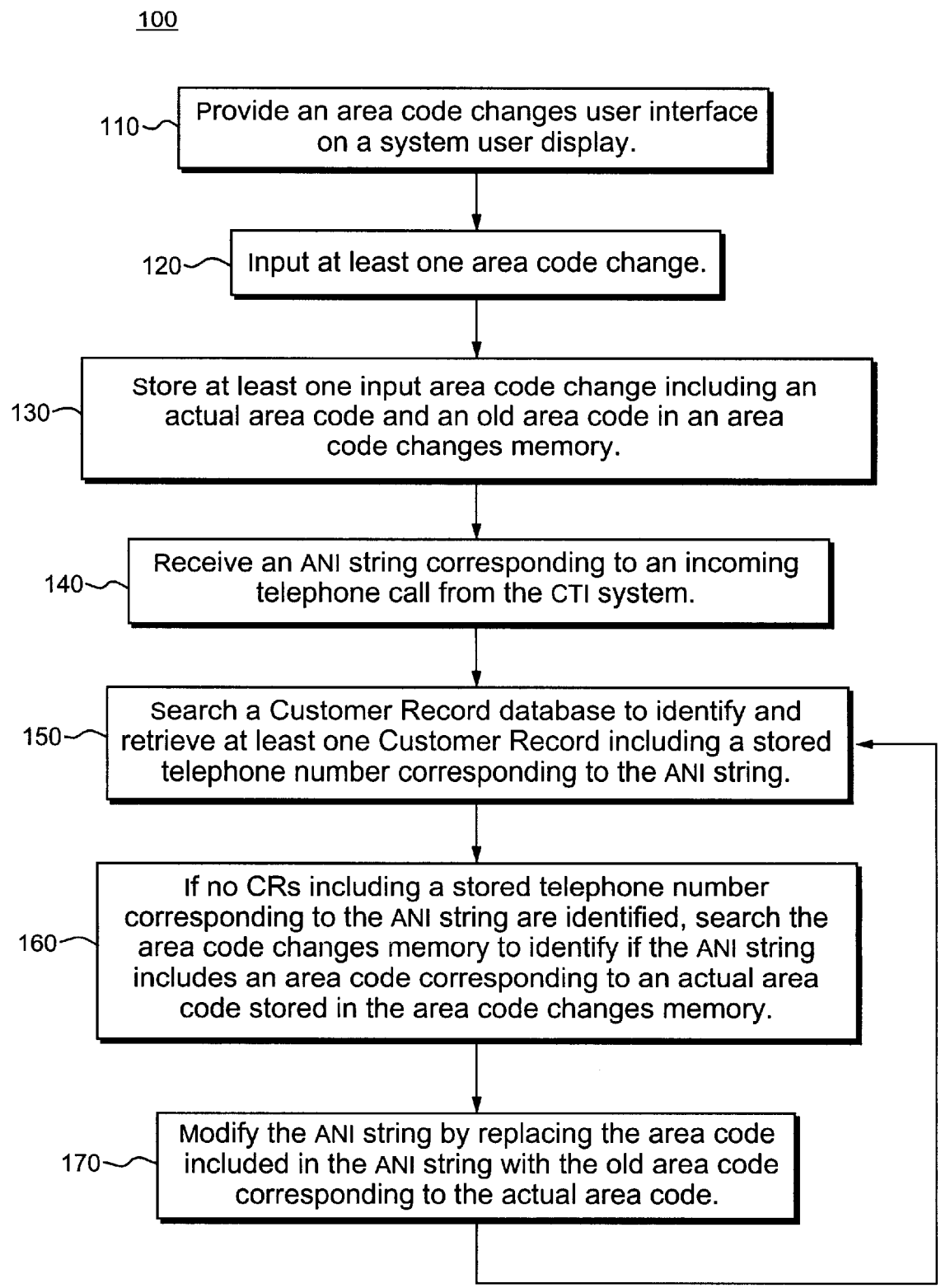
FIG. 5 is a flow chart showing the steps of an area code update method according to the present invention.

Turning now to FIG. 5, a method 100 of retrieving a customer record (CR) from a CR database regardless of an area code change effecting a customer number stored in the CR is illustrated. The method 100 provides a CTI system having an ANI system to perform multiple searches of an applicable CR database using ANI strings that are modified to reflect area code changes implemented by a telecommunications provider.

The method 100 begins by providing an area code changes (ACC) user interface on a system user display, step 110. The ACC user interface is configured to accept and display area code changes input by the system user using at least one system user input device. Then, using the ACC user interface and his or her input device(s), a system user inputs at least one area code change, step 120.

Each area code change input by the user is then stored in an area code changes (ACC) memory, step 130. Each area code change includes an actual area code, which corresponds to a new area code assigned to certain telephone numbers within an old area code as well as the old area code associated with those telephone numbers.

In operation, the CTI system receives an ANI string, which is received by the automatic area code update system 10, which ANI string corresponds to an incoming telephone call received by the CTI system, step 140. Then, at least one CR database is searched to identify and retrieve at least one CR, which includes a stored telephone number corresponding to the ANI string, step 150.

If no CRs including a stored telephone number corresponding to the ANI string are identified, then, in step 160, the ACC memory is searched to identify if the ANI string includes an area code corresponding to a new area code stored in the ACC memory. If the ANI string includes a new area code, then, in step 170, the ANI string is modified by replacing the new area code included in the ANI string with the old area code corresponding to the actual area code and the lookup processor 14 again searches the customer record database 40 for a matching customer record based on the modified ANI code including the old area code. If a match is found, the customer record is retrieved.

In addition to retrieving the customer record, step 170 may include several further steps including automatically immediately updating the customer record with the new area code; displaying a message on the operator's or agent's workstation to inquire about a change in area code; and/or inserting the corrected area code in the customer's record displayed on the agent's workstation and having the agent confirm with the customer, the changed area code which will then be written back to the customer record database 40 once the agent has completed and wrapped up the telephone call.

The search, area code change identification and ANI string modification steps, steps 150–170, respectively, are then repeated until the modified ANI string no longer includes an area code corresponding to an actual area code stored in the ACC memory. At this point, if no CR is identified in the CR database as corresponding to the ANI associated with an incoming telephone call, then the CTI system can be confident that the incoming caller is not an existing customer of the applicable call center client.

The method 100 may further utilize a DNI string received from the CTI system to restrict the CR database search to search only CR databases corresponding to the received DNI string. Thus, a faster search can be performed.

The end result of the method is the provision of a retrieved CR corresponding to an incoming telephone call to one or more call center agents so that the call center agent(s) handling an incoming call has information regarding not only the product or service applicable to the incoming call, but also information regarding the customer placing the incoming call. In this manner, the call center agent can more efficiently handle the incoming call, which results in greater call center productivity.

Accordingly, the disclosed invention provides a system and method whereby a system user having little or no computer programming skills or training can input area code changes in to the system as they are implemented by one or more telecommunications company and the system and method can perform a customer record database search using received ANI strings as well as ANI strings that have been modified by this system to reflect area code changes input into the system. The result is that customer records including telephone numbers having old area code information will be identified by the system and method upon receipt of an ANI string, which includes new, actual area code information that corresponds to an old area code included in a customer record.

Modifications and substitutions by one of ordinary skill in the art are considered to be within the scope of the present invention which is not to be limited except by the claims which follow.

What is claimed is:

1. An automated area code update system interfacing a computer telephony integration (CTI) system, said CTI system interfacing at least one customer record database and being operated by a system user having a system user terminal including a system user display and a system user input device, said automated area code update system comprising:

an area code changes user interface displayed on said system user display, said area code changes user interface configured to accept and display area code changes input by said system user using said system user input device;

an area code changes memory, for storing said input area code changes; and a lookup processor, responsive to an ANI string received from said CTI system that does not correspond to at least one customer record stored in said at least one customer record database, for searching said area code changes memory for an entry corresponding to at least an area code received as a portion of said ANI string, for identifying at least one area code change stored in said area code changes memory corresponding to said at least an area code received as a portion of said ANI string that did not result in a customer record match, and for modifying said ANI string received by substituting said area code received in said ANI string with a changed area code identified as a result of searching said area code changes memory.

2. The automated area code update system of claim 1, wherein said CTI system further includes a dialed number identification (DNI) system providing a DNI output, and wherein said lookup processor is configured to search at least one selected customer record database in response to said DNI system output received from said CTI system.

3. The automated area code update system of claim 1, wherein said system user comprises a system supervisor and said system user terminal comprises a system supervisor terminal including a system supervisor display.

4. The automated area code update system of claim 1, wherein said automated area code update system is adapted to allow said customer record to be modified with said changed area code identified as a result of searching said area code changes memory.

5. In a computer telephony integration (CTI) system having an automatic number identification (ANI) system, said CTI system interfacing at least one customer record database and at least one system user having a system user terminal including a system user display and at least one system user input device, a method of retrieving a customer record from said customer record database regardless of an area code change affecting a customer telephone number stored in said customer record, said method comprising the steps of:

a) providing an area code changes user interface on said system user display, said area code changes interface configured to accept and display area code changes input by said system user using said system user input device;

b) inputting at least one area code change using said area code changes user interface;

c) storing each input area code change in an area code changes memory, each said area code change including a new area code and an old area code;

d) receiving an ANI string from said CTI system, said ANI string corresponding to an incoming telephone call received by said CTI system and including at least an actual area code from which said telephone call is originating;

e) searching said at least one customer record database to identify and retrieve at least one customer record including a stored telephone number corresponding to said ANI string;

if no customer record including a stored telephone number corresponding to said ANI string is identified, performing the steps of:
  f) searching said are e code changes memory to identify if said ANI string includes an actual area code corresponding to at least one new area code stored in said area code changes memory;
  g) modifying said ANI string by replacing said actual area code included in said ANI string with said old area code corresponding to said new area code identified in said area code changes memory; and
  h) repeating steps e through g until a matching customer record is found or until each old area code corresponding to said new area code identified in said area code changes memory has been searched in said customer record database.

6. The method of claim 5, wherein said method further comprises the steps of:
  receiving a DNI string from said CTI system; and
  restricting said customer record database search to search at least one selected customer record database corresponding to said received DNI string.

7. The method of claim 5, further comprising the steps of:
  routing said retrieved customer record corresponding to said incoming call and said incoming call to a call center agent for handling said incoming call.

8. The method of claim 5, further comprising the steps of:
  modifying at least one customer record by replacing said old area code stored in said customer record with said new area code identified is said area code changes memory and storing said modified customer record in said at least one customer record database.

* * * * *